April 26, 1960     M. W. WILSON     2,934,126
TUBELESS TIRE
Filed Nov. 14, 1955

INVENTOR.
MATTHEW W. WILSON
BY
ATTY.

United States Patent Office 2,934,126
Patented Apr. 26, 1960

2,934,126

TUBELESS TIRE

Matthew W. Wilson, Stow, Ohio, assignor to The B. F. Goodrich Company, New York, N.Y., a corporation of New York Application November 14, 1955, Serial No. 546,559

8 Claims. (Cl. 152—362)

This invention relates to inflatable tubeless tires and, more particularly, to an improved construction for the chafers or finishing strips of such tires.

An inflatable tire of the tubeless type utilizes the tire and the wheel rim on which it is mounted as the chamber for the inflation fluid, which is generally air. In such an assembly, the bead regions of the tire must form a fluid-tight seal with the rim and the interior of the carcass must be sufficiently impervious to the inflation fluid to prevent appreciable loss of the latter. Consequently, the interior of the tire carcass is preferably provided with a lining or layer of substantially impervious elastomeric material and the outer surfaces of the tire beads have an abrasion resistant elastomeric covering in which are formed circumferentially extended ribs or projections that provide a sealing engagement with the side flanges of the rim on which the tire is mounted. The bead regions of a tire are, however, subjected to a certain amount of stress and/or chafing due to flexing of the tire in negotiating corners, curves and irregularities in the roadway so that it is customary to provide these regions of the tire with chafing or finishing strips which are relatively narrow strips of fabric formed of twisted multiple filament cords interconnected in a square or leno weave.

In conventional tire constructions the chafer or finishing strips extend exteriorly of the carcass plies from locations within the air containing chamber, provided by the tire and rim, across the bead bases and radially of the tire carcass to locations above the rim flanges. The strips are dipped or coated with sufficient elastomeric material to cover the surface thereof but the fabric is quite close to the outer surfaces of the tire bead and hence portions of the fabric are frequently exposed either during curing or during subsequent mounting or use of the tire. Such exposure of the cords of these strips provides a passage for the air or other inflation fluid along the exposed cords or through the interstices thereof, the fluid either being lost to the atmosphere or entering into the body of the tire carcass where ply separation or related defects may be produced by this fluid.

In an effort to eliminate the above mentioned difficulties encountered with conventional chafer or finishing strips, tubeless tires have been constructed in which such strips are omitted. This omission, however, undesirably reduces the strength and flex resistance of the tire beads. Moreover, since the elastomeric materials of the bead regions become somewhat fluid during the molding and curing operation, there is a tendency for the ends of the reinforcing plies of the carcass, which are turned about the bead cores, to shift. This further weakens the beads and may even cause some of the ply cord ends to pull through the elastomeric material or so close to the surface that there is exposure to the inflation fluid in the tire thereby causing loss of pressure and/or premature tire failure due to ply separation, tread separation or other related causes.

The principal object of this invention is, therefore, to provide an improved tubeless tire construction wherein chafer or finishing strips are provided by a plurality of multifilament cords the interstices between which are blocked to passage of inflation fluid therethrough by deposition therein of solids from a solution of a non-elastomeric synthetic linear polymer so that strengthening of the tire beads and proper retention of the ends of the carcass plies are achieved without sacrifice of the imperviousness of this portion of the tire to the inflation fluid contained therein.

A more specific object of the invention is to provide an improved tubeless tire wherein the beads thereof are provided with chafer or finishing strips of fabric comprising a plurality of cords each formed of a plurality of synthetic filaments twisted together and having the interstices between the filaments blocked to the passage of air longitudinally thereof by water-soluble polyamide deposited therein, whereby exposure of a portion of the fabric to the inflation air in the tire does not provide a path for passage of that air.

A still more specific object of the invention is to provide an improved tubeless tire wherein the tire beads are each provided with a finishing strip of woven fabric having intersecting warp and weft cords each of which is formed of a plurality of twisted filaments of a water-insoluble polyamide with the interstices between the cords blocked to the passage of air therethrough by having water-soluble polyamide deposited therein, the strips being provided with an elastomeric covering united with the elastomeric material of the tire carcass.

The invention further resides in certain novel features of construction of the tire finishing strips and of the tubeless tire in which the invention is embodied, and further objects and advantages thereof will be apparent to those skilled in the art to which the invention pertains from the following description of the presently preferred embodiment, taken in conjunction with the accompanying drawings forming a part of this application and in which.

Figure 1:
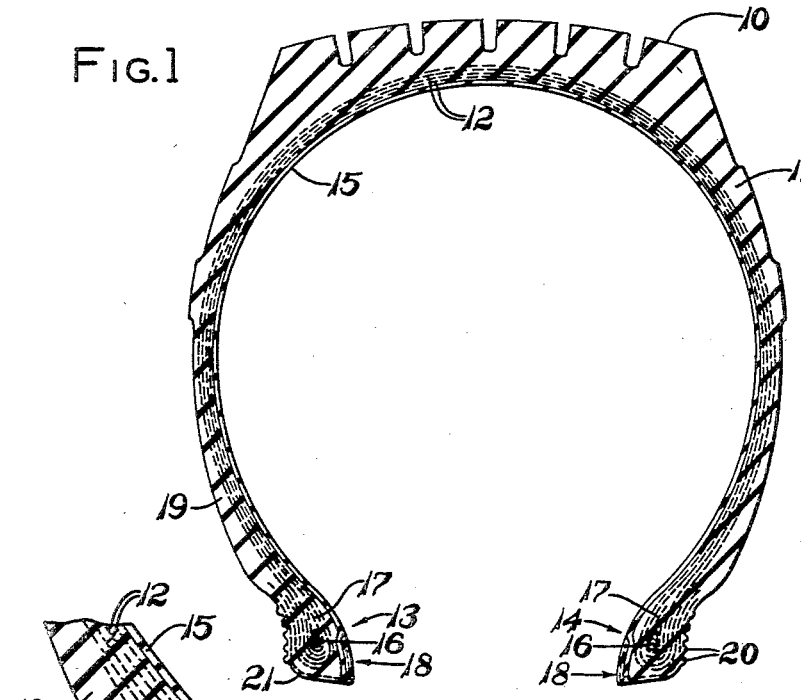
Fig. 1 is a fragmentary transverse sectional view through an inflatable tubeless tire constructed in accordance with this invention.
Figure 2:
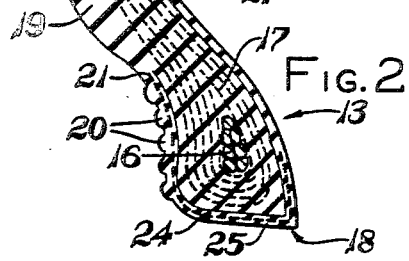
Fig. 2 is an enlarged fragmentary sectional view of one bead of the tire shown in Fig. 1 more clearly illustrating the construction thereof.

Referring first to Fig. 1 of the drawing, the inflatable vehicle tire illustrated therein includes a tread portion 10 surrounding an annular carcass 11 of resilient elastomeric material, such as natural or synthetic rubber, and reinforcing cords, the latter being disposed in superposed plies 12. The inner periphery of the tire is defined by spaced bead portions 13 and 14 which are adapted to fit on the rim of a vehicle tire and cooperate therewith to provide a chamber for the inflation fluid without the need of a separate tube or container. Therefore, the interior of the tire carcass is preferably provided with a layer or lining 15 of an impervious elastomeric material such as the isoolefin-diolefin copolymer commonly known as Butyl rubber.

The bead regions 13 and 14 of the tire are identical and each is formed by turning the edges of the cord plies 12 successively about a circumferentially extending bead core, such as 16, which may be formed by a bundle of wires suitably wrapped and provided with a flipper strip 17, the ends of which extend radially of the sidewall of the tire. Extending externally over the turned ends or edges of the reinforcing cord plies 12 in each bead is a chafer or finishing strip 18. These strips are relatively narrow and extend transversely of the tire beads with the inner edge of each strip positioned within the interior of the tire carcass just above the bead toe. The strips extend across the bead bases radially of the sidewalls a short distance to positions therein above the outer edges of the flanges of tire rim on which the tire is adapted to be mounted. The finishing strips 18 are provided with an elastomeric material or materials so that during curing of the tire they unite with the elastomeric materials of the inner layer or liner 15 and with the outer covering or sidewall rubber 19. Also during the curing and molding operations of the tire the outer side surfaces of the beads are provided with circumferentially extending sealing ribs or projections 20.

Tires constructed in this manner and having the cords of the chafer or finishing strips 18 formed of a plurality of filaments twisted together provide good strength and flex resistance. However, when the fabric of the strips 18 has the cords thereof arranged in a weftless or woven form such as square woven or leno weave of the types normally employed for chafer fabrics, difficulties are frequently encountered because any exposure of a portion of a cord in such fabric allows passage of the inflation fluid along the cord or between the individual filaments thereof. This passage of fluid, known as wicking, results in loss of inflation pressure when the cord communicates both with the interior of the tire and the atmosphere. A more serious condition, however, occurs when the inflation fluid thus permeating a cord or cords of the finishing strip cannot vent externally of the tire since such fluid then forms a pocket or pockets within the body of the tire producing ply and/or tread separation which are highly detrimental to the life of the tire.

Attempts to remedy wicking of fabrics utilized as chafer or finishing strips by merely providing thicker layers of rubber or other elastomeric material upon the conventional square woven or leno weave fabric have been unsuccessful, since as mentioned heretofore, the elastomeric material is substantially fluid during curing of the tires so that the cords of the fabric can still become exposed during molding or move so close to the surface that there is exposure of a portion of the cords after only relatively minor chafing or flexing of the beads. Weaving the finishing strip fabric from monofilaments eliminates the possibility of wicking through the cords but not along the exterior thereof which may still occur when the bonding of the elastomeric covering to the fabric is not complete. Moreover, monofilament fabric does not possess the optimum flex resistance or many of the other characteristics desired in a finishing strip.

In accordance with this invention, the advantages of employing a chafer or finishing strip of multifilament yarns or cords are retained, while the difficulties of fluid wicking therealong or therethrough are eliminated by employing in such strips fabric comprising a plurality of cords each of which is formed by a plurality of twisted filaments of a synthetic material with the interstices between the filaments blocked to prevent passage of fluid. This is achieved by depositing in the interstices between the filaments solids from a solution of a substance which is a non-elastomeric synthetic linear polymer, the solvent being a substance which does not dissolve the filaments. In the preferred embodiment, the fabric of the finishing strips is formed from cords comprised of bundles of twisted filaments of a water-insoluble linear polyamide, commonly known as nylon, which has been treated with an aqueous solution of a water-soluble polyamide and then dried so that soluble polyamide is deposited in the interstices between the filaments.

Figure 3:
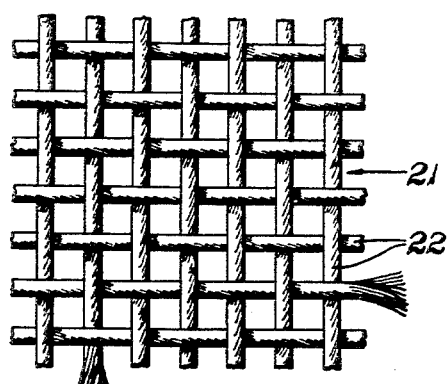
Fig. 3 is an enlarged plan view of the improved fabric of the finishing strip employed in constructing the tire illustrated in Fig. 1.
Figure 4:
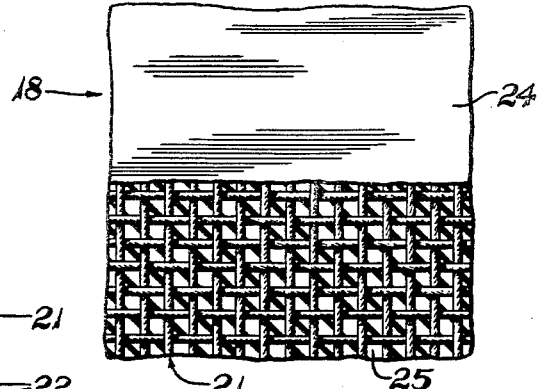
Fig. 4 is an enlarged plan view of the portion of the strip shown in Fig. 3 with a part of the elastomeric covering removed to more clearly show the nature of the fabric reinforcement thereof.

In the illustrated embodiment, the fabric 21 of the finishing strip 18 is shown to an enlarged scale in Figs. 3 and 4 as comprising intersecting warp and weft cords 22 disposed in an open square weave. The warp and weft cords of this fabric are identical and each is formed of a plurality of filaments of a water-insoluble linear polyamide, commonly referred to as nylon, which may be of the type described in U.S. Patents 2,071,250, 2,071,253, 2,130,523 or 2,130,948. Each cord 22 is comprised of a plurality of separate filaments 23 disposed in a single bundle or yarn and provided with a twist of low order as, for example, in the order of three turns per inch. In cord of this nature, the spaces or interstices between the filaments 23 are normally unobstructed so that fluid under pressure can pass therethrough. In accordance with this invention, however, such passage of fluid is prevented by having solids deposited in the said interstices from an aqueous solution of a water-soluble form of polyamide. This is preferably effected by dipping the cord in the solution prior to weaving the cord into the fabric.

The aqueous solution in which the cords are dipped can be prepared from any of known water-soluble nylons examples of which are disclosed in U.S. Patents 2,176,074, 2,191,556, 2,339,237 and 2,367,469. The solution should preferably have a concentration in the order of 5% to 10% while the rate of movement of the cord through the dip and the tension on the cord should be such that the solution completely penetrates the cord. After dipping, excess solution may be removed from the surface of the cord which is then dried and, when the treatment has been properly effected, the cord will be found to have picked up about 10% solid material which is deposited primarily in the interstices between the filaments. The dipped cord is stiffer than undipped cord of like construction but not as stiff as a monofilament of like diameter. In other words, the dipping does not convert the cord into a rod so that the cord essentially retains its nature as a bundle of twisted filaments. The interstices between the filaments of the cord are, however, blocked to passage of fluid therealong by deposits of solid polyamide therein.

After the dipping operation, the cord is woven into the fabric 21 and strips of the latter are then incorporated into the beads of a tire carcass exteriorly of the carcass plies. To facilitate this incorporation and union of the fabric strip with the other components of the tire, the fabric 21 is provided with one or more elastomeric materials before its application to the tire beads. These elastomeric materials may comprise a suitable cement applied to the fabric by dipping or other known operations and may also include a surface layer or layers or coatings of uncured rubber calendered onto the fabric. For example, Fig. 4 shows that the fabric 21 may have the opposite surfaces provided with elastomeric layers 24 and 25 which may be of different natures. Thus, the layer 24 (a part of which is removed in Fig. 4) may be an elastomer with high fluid imperviousness, such as an isoolefin-diolefin copolymer commonly known as butyl rubber, while the layer 25 may be an elastomer such as natural rubber, GR-S or other synthetic rubber which has good abrasion resistance and is the same as, or compatible with, the elastomer of the sidewall covering 19.

A strip of this nature is applied to each bead of the tire during the building operation in the same manner that conventional chafer or finishing strips are utilized. The side of the strip provided with the layer 24 is placed innermost so that the highly impervious elastomer thereof is in contact with the highly impervious liner 15 of the tire. The outer layer 25 of this strip therefore forms the base of the tire bead while the outer edge of the strip extends outwardly and around the bead and is joined with the inner edge portion of the sidewall covering 19. The tire thus constructed is then placed in a suitable mold and subjected to heat and pressure in the conventional manner so that the elastomers of the chafer or finishing strip are united with the elastomers of the tire carcass, the liner, and the sidewalls thereof. During this operation the elastomer on the outer surfaces of the tire beads flows into suitable configurations of the mold thereby forming the sealing ribs 20. A tire thus constructed may be mounted and used in the same manner as other tubeless tires but has improved characteristics in that there can be no fluid wicking through the bead regions even though a portion or portions of the fabric 21 in the finishing strip be exposed to the inflation fluid since there is no path for the fluid along or through the filaments of the fabric.

The invention has been described in detail in conjunction with an illustration of but one specific embodiment. It will be apparent however, that the principles of the invention can be utilized with cords formed from more than a single yarn and having a twist other than in the order of three turns to the inch. Also, the cords may be embodied as the reinforcing fabric for finishing strips of tires by disposing the cords in configurations other than the square woven form shown. Thus, the cords may be united in a leno weave or may be arranged in a weftless, or substantially weftless, fabric united by an elastomer with two plies of such fabric employed adjacent each other and angularly disposed as is well understood in the art. It will also be apparent that the dipping operations are preferably effected upon the cords prior to weaving. The dipping is effected at that stage for the purpose of insuring good penetration of the solution. However, if satisfactory penetration can be achieved after weaving of the fabric, the dipping may be effected at that time. It will also be apparent that where cords formed of a plurality of yarns having a relatively high order of twist are utilized, complete penetration of the solution can be facilitated by wet twisting the cords or the yarns through the solution rather than simply dipping the cords after their formation.

It will also be evident that suitable cord-to-rubber adhesives can be applied to the cord, or to the fabric woven therefrom, prior to incorporating the fabric into the elastomeric coatings or layers. However, the solvents used for such adhesives must either be non-solvents for the solids deposited between the cord filaments or the cord should be treated prior to application of the adhesive to render the deposited solids non-soluble in the solvent of the adhesive. Finally, while the invention has been specifically disclosed as embodied in cords formed of water-insoluble polyamide with a water-soluble polyamide deposited between filaments comprising the cords, it will be evident that the principles of the invention may also be applied to cords formed from other synthetic filaments and that non-elastomeric synthetic linear polymers other than water-soluble polyamide may be deposited between the cord filaments to prevent wicking thereof. Without limitation thereto other suitable polymers for the deposit between the cord filaments may include polyvinyl alcohol and polyvinyl acetate. Additional materials suitable for this purpose will be readily apparent to those skilled in the art of polymer chemistry.

In view of the above specifically mentioned and other equivalents and adaptions of the invention, which will be readily apparent to those skilled in the art, the invention is not to be considered limited to the specific example herein illustrated and described in detail except as may be required by the spirit and scope of the appended claims.

Having thus described the invention, I claim:

1. A non-wicking fabric adapted for use in a tubeless vehicle tire comprising a plurality of interconnected multiple-filament cords of water-insoluble nylon with the interstices between the filaments of each cord blocked to the passage of air therethrough by water-soluble nylon deposited therein.

2. A non-wicking fabric adapted for use in a tubeless vehicle tire comprising intersecting warp and weft cords each comprising a plurality of water-insoluble nylon filaments twisted together with the interstices between the filaments of each cord blocked to the passage of air therethrough by water-soluble nylon deposited therein.

3. In a tubeless tire having spaced circumferentially extending beads, a finishing strip incorporated in each of said beads with each strip extending laterally of a bead base and outwardly therefrom to a region in the outer sidewall of the tire, the said strips each comprising a plurality of multifilament cords formed of twisted filaments of a water-insoluble nylon with the interstices between the filaments blocked to the passage of air therethrough by water-soluble nylon deposited therein.

4. In a tubeless tire having spaced circumferentially extending beads, an elastomer covered fabric finishing strip incorporated in each of said beads with each strip extending circumferentially of a bead laterally across a bead base and outwardly therefrom to a region in the outer sidewall of the tire, the said strips each comprising a woven fabric formed of intersecting warp and weft cords each comprising a plurality of water-insoluble nylon filaments twisted together with the interstices between the filaments of each cord blocked to the passage of gas therethrough by water-soluble nlylon deposited therein.

5. In a tubeless tire having an impervious elastomeric lining and spaced circumferentially extending beads, a finishing strip incorporated in each of said beads with each strip extending across a bead base and outwardly therefrom to a region in the outer sidewall of the tire, the said strips each comprising a plurality of cords formed of twisted filaments of a water-insoluble nylon with the interstices between the filaments blocked to the passage of air therethrough by water-soluble nylon deposited therein, and an elastomeric material calendered on each strip and united with the said lining.

6. A tubeless tire comprising a cord reinforced elastomeric carcass having spaced circumferentially extending beads provided with bead cores about which the ends of the cord reinforcements are turned, and a fabric reinforced strip disposed outwardly of the cord reinforcements and extending across the base of each bead and radially of the outer sides thereof a limited distance beyond the bead bases, the fabric in each of said strips being composed of woven cords formed of twisted filaments of a water-insoluble nylon with the interstices between the filaments blocked to the passage of air therethrough by water-soluble nylon deposited therein, the said strips also including elastomeric material calendered an said strips and united with the elastomeric carcass.

7. A tubeless tire comprising a hollow annular body of resilient elastomeric material open at the radial inner portion and having wheel-engaging bead portions at the inner periphery, circumferentially extending bead cores disposed in the bead portions, reinforcing cord plies embedded in said annular body and extending from bead portion to bead portion with the edges of the plies turned around said bead cores, an impervious elastomeric lining on the interior of said carcass, a strip of textile material embedded in each of said bead portions outwardly of said reinforcing plies with each of said strips extending a limited distance beyond the wheel-engaging area of the bead portion in which it is embedded, the said strips comprising a plurality of cords formed of twisted filaments of a water-insoluble nylon with the interstices between the filaments blocked to the passage of air therethrough by water-soluble nylon deposited therein, an air impervious elastomeric material on the inner surface of each of said strips united with said liner, and a different elastomeric material on the outer surface of each of said strips united with the material comprising the outer surface of the tire.

8. A tubeless tire comprising a hollow annular body of resilient elastomeric material open at the radial inner portion and having wheel-engaging bead portions at the inner periphery, circumferentially extending bead cores disposed in the bead portions, reinforcing cord plies embedded in a said annular body and extending from bead portion to bead portion with the edges of the plies turned around said bead cores, an air-impervious elastomeric lining on the interior of said carcass, a strip of textile material embedded in each of said bead portions outwardly of said reinforcing plies with each of said strips extending a limited distance beyond the wheel-engaging area of the bead portion in which it is embedded, the said strips comprising a fabric of woven cords formed of twisted filaments of a water-insoluble nylon with the interstices between the filaments blocked to the passage of air therethrough by water-soluble nylon deposited therein, an air-impervious elastomeric material calendered on the inner surface of each of said strips and united with said liner, and a different elastomeric material calendered on the outer surface of each of said strips and united with the material comprising the outer surface of the tire.

References Cited in the file of this patent

UNITED STATES PATENTS

| | | |
|---|---|---|
| 2,551,175 | Smith | May 1, 1951 |
| 2,590,586 | Thompson et al. | Mar. 25, 1952 |
| 2,592,844 | Antonson | Apr. 15, 1952 |
| 2,601,394 | Hansen | June 24, 1952 |
| 2,713,382 | Bosomworth et al. | July 19, 1955 |
| 2,735,258 | Crandall | Feb. 21, 1956 |

FOREIGN PATENTS

| | | |
|---|---|---|
| 1,084,382 | France | July 7, 1954 |

UNITED STATES PATENT OFFICE

CERTIFICATE OF CORRECTION

Patent No. 2,934,126                        April 26, 1960

Matthew W. Wilson

It is hereby certified that error appears in the printed specification of the above numbered patent requiring correction and that the said Letters Patent should read as corrected below.

Column 6, line 44, for "an" read -- on --.

Signed and sealed this 3rd day of January 1961.

(SEAL)
Attest:

KARL H. AXLINE
Attesting Officer

ROBERT C. WATSON
Commissioner of Patents